G. W. DUVALL, N. H. BEEBE AND H. E. SMITH.
COMBINED EVENER AND CUTTER.
APPLICATION FILED OCT. 16, 1919.
1,337,056.
Patented Apr. 13, 1920.
2 SHEETS—SHEET 1.
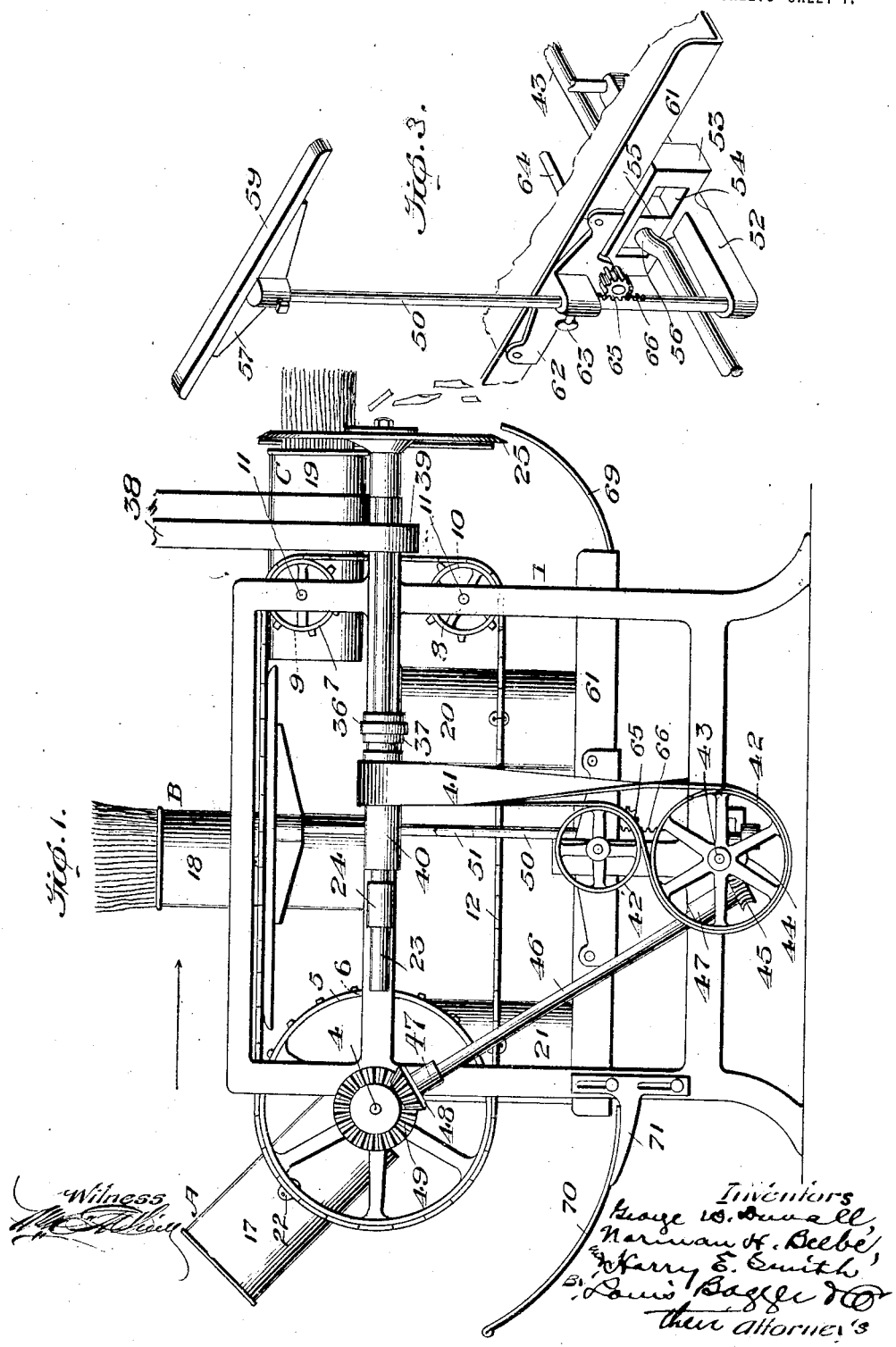

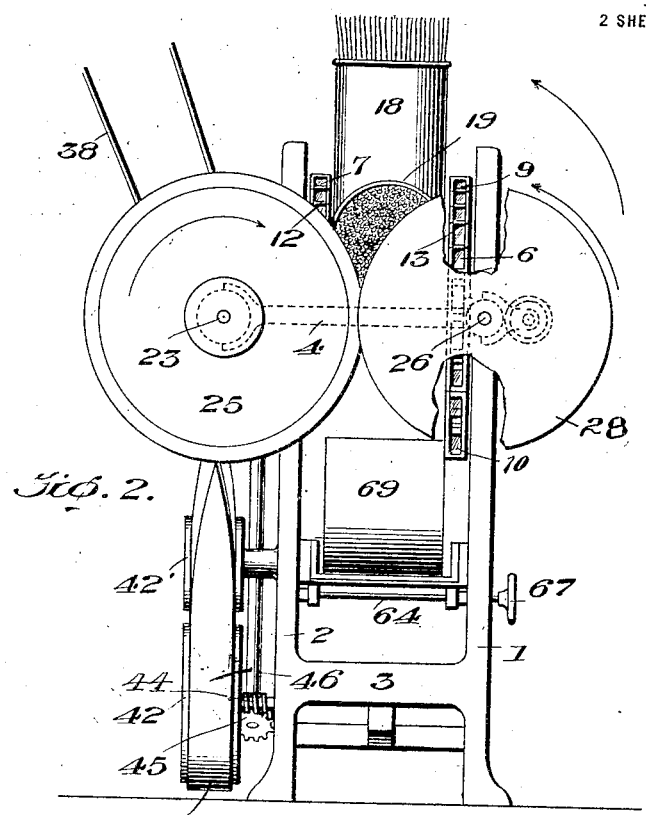
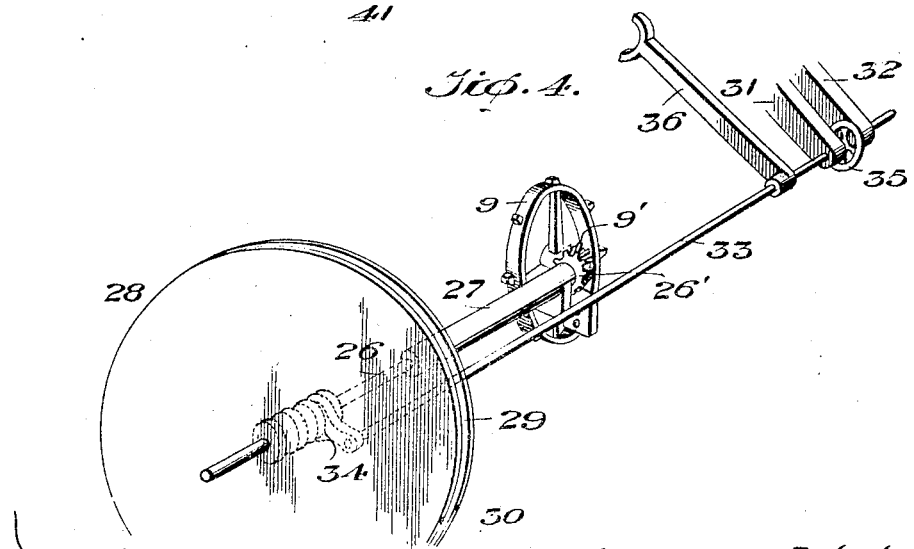

UNITED STATES PATENT OFFICE.

GEORGE W. DUVALL, NORMAN H. BEEBE, AND HARRY E. SMITH, OF DAVENPORT, IOWA, ASSIGNORS TO MODERN BROOM MACHINERY COMPANY, OF DAVENPORT, IOWA, A CORPORATION OF IOWA.

COMBINED EVENER AND CUTTER.

1,337,056.   Specification of Letters Patent.   Patented Apr. 13, 1920.

Application filed October 16, 1919. Serial No. 331,109.

*To all whom it may concern:*

Be it known that we, GEORGE W. DUVALL, NORMAN H. BEEBE, and HARRY E. SMITH, citizens of the United States, residing at Davenport, in the county of Scott and State of Iowa, have invented certain new and useful Improvements in Combined Eveners and Cutters, of which the following is a specification.

This invention relates to a combined evener and cutter for stalks or fibers of broom-corn or similar material in the process of broom manufacture.

One object is to assemble the stalks in the different containers with the twig or sweeping ends therein, and vibrate or shake the container until the twigs or sweeping ends are even on the bottom of the receptacles.

Another object is to sever the projecting ends of the stalks after they have been properly assembled in the several containers.

Another object is to reverse the containers and their contents after the cutting operation and again agitate the contents of the container to even up the trimmed ends of the stalks in case some few stalks of the fiber were too short to reach the knife when the corn was cut to length.

In the accompanying drawings:—

Figure 1 is a side elevation of the complete machine;

Fig. 2 is an end elevation of the same;

Fig. 3 is a perspective view of the agitating means;

Fig. 4 is a detail perspective view of the longitudinal adjustable mechanism of the cutter and feeders.

The main frame consists of side members 1 and 2 connected by transverse members 3. Journaled in one end of the main frame is a shaft 4, upon which is mounted a pair of sprockets 5 and 6. At the opposite end of the machine on either side are two sets of similar sprockets 7 and 8, and 9 and 10, each of which are mounted on suitable stub-shafts 11. Adapted to pass over the different sets of sprocket-wheels are sprocket-chains 12 and 13. These sprocket-chains are spaced apart, and adapted to receive therebetween a plurality of containers 17, 18, 19, 20 and 21, which are secured as at 22 on either side of the container to the sprocket-chains. These containers are adapted to be suspended transversely of the chains.

Secured longitudinally of the main frame is a shaft 23 journaled in suitable bearings 24 to the side of the main frame. Secured to the outer end of this longitudinal shaft 23 is a disk-cutter 25. Arranged longitudinally of the main frame, and on the opposite side of the longitudinal shaft 23 is a similar shaft 26 supported in suitable bearings 27 attached to the side of the main frame. Mounted upon the outer end of this shaft is a feeding-disk 28 provided with an annular groove 29, and preferably serrated as at 30 on its periphery. The diameters of the cutting-disk 25 and and the feeding-disk 28 are such that the cutter is received within the annular groove 29. The cutting-disk and feeding-disk are adapted to be moved longitudinally of the frame, preferably in the following manner:—Mounted upon suitable brackets 31 and 32 extending from the main frame is a longitudinally adjustable rod 33, one end of which is received within the grooved bearing 34 of the feeding-disk, and the other in apertures in the brackets 31—32. Received between these brackets is a hand-wheel 35 having screw-threaded connection with the adjustable rod 33. Extending transversely of the machine, and keyed to the adjustable rod 33 is an arm 36, the outer free end of which is received within a grooved collar 37 keyed to the disk cutter-shaft 23. By this construction, the actuation of the hand-wheel 35 will effect a longitudinal movement of the rod 33 and the feeding-disk 28, likewise the longitudinal movement of the disk cutter shaft 23, thereby effecting an accurate adjustment of the disk-cutter and feeding-disk.

Power is applied to the cutting disk shaft 23 by a main power belt 38 passing over drive pulley 39. Mounted on the opposite end of the disk-cutter 23 is a comparatively long pulley 40 adapted to receive a second belt 41, the other end of which is adapted to pass around a belt pulley 42 mounted on the stub-axle 43 at the extreme lower side of the main frame, an idler 42' effecting the desired tension of the belt 41. A worm 44 keyed to the belt pulley 42 is adapted to impart motion to a worm-wheel 45 connected on the lower end of the drive-shaft 46 mounted in suitable bearings 47, 47, upon the main frame. The upper end of the drive-shaft 46 is provided with a pinion 48, which is adapted to mesh with a bevel-gear 49 keyed to the shaft 4, which receives the main sprockets 5 and 6.

In this manner, power is transmitted from the disk-cutter shaft 23 to the drive-pulley 42, and thence to the shaft 46 to the drive sprockets 5 and 6, thereby imparting a continuous motion to the sprocket-chains 12 and 13, which in turn cause the containers to travel continuously over a given path of travel. These containers are adapted to travel from one end of the machine to another in a substantially vertical position until they reach at the end of the machine a smaller set of sprockets, whereupon the containers are turned to a horizontal position and adapted to pass downwardly by the cutting-disk and feeding-disk, after which they are adapted to travel in an opposite direction, with the containers now inverted, to the rear end of the machine, where the contents thereof are taken from the several containers.

A rotary motion is imparted to the feeding-disk 28 by means of a set of pinions 26' and 9', the latter being connected to the sprocket 9, and the former being connected to the shaft 26 of the feeding-disk. In this manner power is derived through one of the sprocket-chains for imparting motion to the feeding-disk.

It is desirable to agitate the several containers upon their horizontal travel from the front to the rear of the machine in order that the contents thereof may be level. To accomplish this, two vertical rods 50 and 51 are mounted for vertical movement on either side of the machine, their lower ends being received within a yoke 52. This yoke is provided centrally thereof with a member 53 having an elongated slot 54 longitudinally thereof. Received within this slot is a block 55, through which passes an offset portion 56 of a transversely-arranged shaft 43. Secured to the upper end of each of the vertical rods 50 and 51 are brackets 57 provided with shoes 59. These shoes are adapted to engage the under side of the sprocket-chains, and through the rotation of the drive-shaft 43 the rods 50 and 51 are reciprocated, thereby effecting an agitation of the chains as the containers travel longitudinally of the machine, causing the loose broomcorn or the contents of the containers to be even on the bottoms of the containers. As explained, as the containers assume a horizontal position, the projecting ends of the loose broom-corn are severed, after which the containers assume an inverted or reversed direction, their open ends being on the lower side. Means are provided in the form of a pan 61 which is adapted to retain the severed broom-corn within the containers while in this reverse position, and as a means for agitating the broom-corn to even up the now-projecting ends, the pan 61 is preferably agitated in the following manner:—

Brackets 62, 62, are secured to the sides of the pan, which brackets are adjustably secured to the vertically movable rods 50 and 51 by thumb-nuts 63, the pan, as will be seen, being movable simultaneously with the vertical movement of the rods 50 and 51. It is evident the pan must be raised or lowered to suit the length of the material being cut. To accomplish this, a shaft 64 is arranged transversely of the pan 41, having pinions 65 on either end thereof adapted to register with the toothed portion 66 of the rods 50 and 51. A hand-wheel 67, arranged on one end of the shaft 64, effects the vertical adjustment of the pan 61, it being retained in its adjusted position by thumb-nuts 63.

A shield 69 extends from one end of the pan, curving upwardly toward the disk-cutter to act as a guide for the contents of the containers while passing from the disk-cutter to the agitating-pan. At the opposite end of the pan is a similar vertical adjustable shield 70 secured by a vertically adjustable bracket 71 to the main frame, this shield being adapted to be adjusted to the various lengths of the loose corn being cut.

The operation of the machine is as follows:—The loose broom-corn is first placed in the containers while they are in position A, with the even twig ends down. As the container is passed along on its way to the knife, as indicated at B, the jolting movement as explained jolts the fibers and stalks until all are even on the twig or sweeping ends. The container now assumes a position indicated at C, at which position it is passed between the cutter and feeding-knives, and the protruding ends of the stalks severed. Continuing to travel on, the container turns upon the lower set of the sprockets 8 and 10, and assumes a reverse position, that is with the open end down, allowing the large stalks or butt ends of the broom-corn to rest on the vibrating-pan 61. Some few of the fibers may have been too short to reach the knife when the container of corn was cut to length, therefore the table 61 being agitated will effect an evening of these projecting ends as the containers force the corn along over the pan. After passing over pan 61, the shield 70 still retains the stalks within the container, until the operator has had an opportunity to remove the same from the containers, before they can assume their next cycle of operation.

We claim:—

1. The combination with a movable carrier, a plurality of containers arranged on said movable carrier adapted to receive a quantity of loose broom-corn, means for agitating said containers, means for severing the protruding ends of the loose broom-corn, means for reversing the position of the containers after severing the protruding ends of the broom-corn, and means for retaining and leveling the trimmed ends of the broom-corn within the containers while in the reversed position.

2. The combination with a continuously moving carrier, a plurality of containers arranged on said carrier adapted to receive a quantity of loose broom-corn, means for agitating said carrier while in transit, and means for severing the protruding ends of the loose broom-corn.

3. The combination with a movable carrier, a plurality of containers arranged on said movable carrier adapted to receive a quantity of loose broom-corn, cutting and feeding means arranged transversely of the path of travel of the several cutters, vertically reciprocating means for agitating the carrier while in transit to the trimming means, and vertically reciprocating means for agitating the contents of the container after leaving the trimming means.

4. The combination with a movable carrier, a plurality of containers arranged on said movable carrier adapted to receive a quantity of loose broom-corn, means for severing the protruding ends of the loose broom-corn, means for reversing the position of the containers after the ends of the broom-corn are severed, and means for retaining the broom-corn within the containers in the reversed position.

5. The combination with a continuously moving carrier, a plurality of containers arranged on said movable carrier adapted to receive a quantity of loose broom-corn, means for agitating said carrier while in transit, means for trimming the protruding ends of the broom-corn, means for reversing the position of the containers after the ends of the broom-corn are trimmed, means for retaining and leveling the trimmed ends of the broom-corn in the containers while in the reversed position, means for imparting a rotary motion to said trimming means, and a driving means common to said trimming means, reciprocating a carrier means, for imparting motion thereto.

6. The combination with a movable carrier, a plurality of containers arranged on said movable carrier adapted to receive a quantity of loose broom-corn, cutting and feeding means arranged transversely of the path of travel of the several containers, and means for adjusting the cutting and feeding means relative to the containers, whereby the broom-corn may be cut to different lengths.

7. The combination with a movable carrier, a plurality of containers arranged on said carrier and adapted to receive a quantity of loose broom-corn, vertically reciprocating means for agitating said containers while in transit, a cutter and feeder arranged to sever the protruding ends of the loose broom-corn, means for reversing the position of the containers after the ends of the broom corn are severed, vertically reciprocating means for leveling the trimmed ends of the loose broom-corn, means for imparting a rotary motion to said cutting means, and a driving means common to said cutting, reciprocating and carrier means for imparting motion thereto.

8. The combination with a movable carrier, a plurality of containers arranged on said movable carrier adapted to receive a quantity of loose broom-corn, means for trimming the protruding ends of the loose broom-corn, means for reversing the position of the containers after the ends of the broom corn are trimmed, means for retaining the broom-corn within the containers in the reversed position, and a common agitating means for agitating the carrier before reaching the trimming mechanism and agitating the contents of the containers after leaving the trimming mechanism.

In testimony whereof we affix our signatures.

GEORGE W. DUVALL.
NORMAN H. BEEBE.
HARRY E. SMITH.